United States Patent
Lawless et al.

(10) Patent No.: US 7,255,226 B2
(45) Date of Patent: Aug. 14, 2007

(54) CONVEYOR SYSTEM LOAD TRANSFER DEVICES

(75) Inventors: Robert Joseph Lawless, Acworth, GA (US); Roumen V. Stoyanov, Acworth, GA (US)

(73) Assignee: Jolex Enterprises, Inc., Kennesaw, GA (US)

( * ) Notice: Subject to any disclaimer, the term of this patent is extended or adjusted under 35 U.S.C. 154(b) by 0 days.

(21) Appl. No.: 11/014,888

(22) Filed: Dec. 17, 2004

(65) Prior Publication Data

US 2005/0098411 A1    May 12, 2005

Related U.S. Application Data

(63) Continuation of application No. 10/631,945, filed on Jul. 31, 2003, now Pat. No. 6,866,139.

(60) Provisional application No. 60/400,632, filed on Aug. 1, 2002.

(51) Int. Cl.
*B65G 13/00* (2006.01)
(52) U.S. Cl. .................. 198/782; 193/35 SS; 193/37; 193/35 R; 198/780
(58) Field of Classification Search ............... 198/782; 193/35 SS; 108/57.15
See application file for complete search history.

(56) References Cited

U.S. PATENT DOCUMENTS 1,761,199 A * 6/1930 Drake .................... 198/782
3,690,440 A    9/1972 Macpherson
3,833,132 A * 9/1974 Alduk .................... 414/793.8
3,901,378 A    8/1975 Rolland
4,042,101 A    8/1977 Krammer et al.
4,143,755 A    3/1979 Keller
4,219,115 A    8/1980 Moore
4,696,386 A    9/1987 Lem
4,860,973 A    8/1989 Fenner
5,145,049 A * 9/1992 McClurkin ................ 198/374
5,207,313 A    5/1993 Gebhardt
5,257,895 A * 11/1993 vom Stein ................ 414/608
6,176,283 B1    1/2001 Knerr
6,328,154 B1    12/2001 Huber
6,575,286 B1    6/2003 Mills
6,672,450 B2    1/2004 Horne
2005/0072657 A1    4/2005 Lawless

FOREIGN PATENT DOCUMENTS

CH    629 443 A5    4/1982
DE    43 09 222 A1    9/1993

* cited by examiner

*Primary Examiner*—Gene C. Crawford
*Assistant Examiner*—Leslie A. Nicholson, III
(74) *Attorney, Agent, or Firm*—Sutherland, Asbill & Brennan LLP (57) ABSTRACT

Conveyor systems for storage and movement of goods on pallets and slip sheets. The transfer structures enable slip sheet mounted loads to be transferred to a roller conveyor by providing structures that cooperate with wide platen forks of a lift truck. The structures provide roller contact between a portion of the underside of the slip sheet at all times. In other areas there is alternatively contact between a lift truck platen or additional rollers that cooperate in a manner making it possible to move the slip sheet mounted load from the lift truck to an adjacent conveyor system.

8 Claims, 9 Drawing Sheets

CONVEYOR SYSTEM LOAD TRANSFER DEVICES

RELATED APPLICATIONS

This application is a continuation of U.S. patent application Ser. No. 10/631,945 filed Jul. 31, 2003 now U.S. Pat. No. 6,866,139 and claims the benefit of U.S. Provisional Application No. 60/400,632 entitled "Conveyor System Load Transfer Devices" filed on Aug. 1, 2002, which is incorporated herein by reference.

FIELD OF THE INVENTION

This invention relates to conveyor systems for storage and movement of goods on pallets and slip sheets and, in particular, to the use of slip sheets with roller conveyor systems.

BACKGROUND OF THE INVENTION

Goods are stored and shipped throughout the world in relatively uniform size loads that rest on either pallets or thin plates of pasteboard or other fiber material known as slip sheets. Slip sheets provide cast, weight, size and other advantages as compared to pallets but are not as stiff as pallets and must therefore be supported with contact over a larger portion of their undersides than pallets. Accordingly, while pallets can be lifted and transported by contact between relatively narrow regions of the pallet understructure and forks, such as conventional lift truck forks, much wider structures must be used to support slip sheets bearing loads. Transfer of loads resting on slip sheets therefore conventionally occurs by sliding the slip sheet and load between two locations by either pushing the slip sheet and load or pulling the slip sheet by grasping an edge of the slip sheet. There are numerous drawbacks associated with these activities.

As a result, it is desirable to provide improved structures and means for transferring loads carried on slip sheets on to and off of roller conveyor systems.

DESCRIPTION OF THE INVENTION

The transfer structures of this invention enable slip sheet mounted loads to be transferred, for instance, from a lift truck to a roller conveyor by providing structures that cooperate with wide platen forks of a lift truck. The structures provide roller contact between at least a portion of the underside of the slip sheet at all times. In other areas there is alternatively contact between a lift truck platen or additional rollers that cooperate in a manner making it possible to move the slip sheet mounted load from the lift truck to an adjacent conveyor system.

Figure 1:
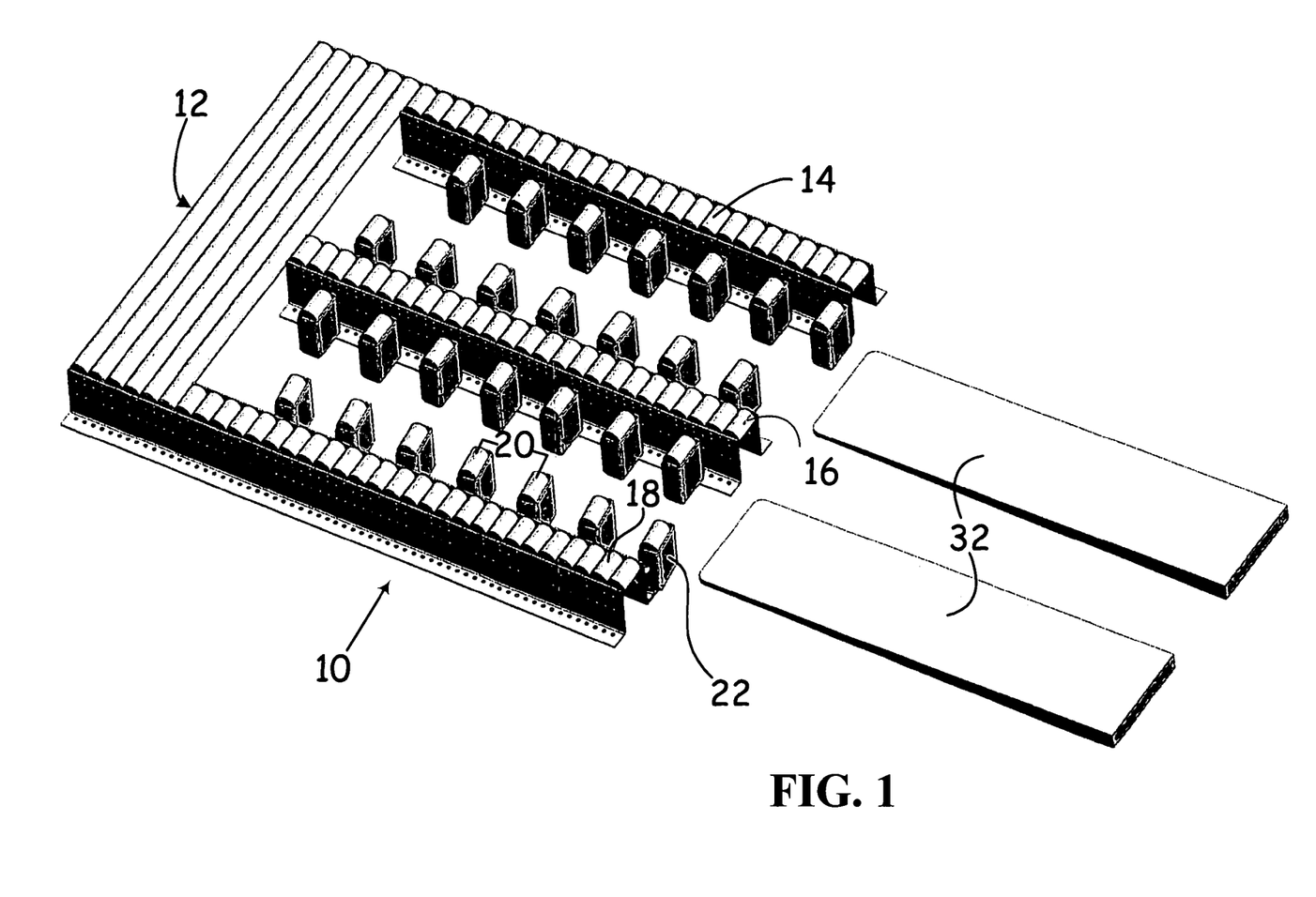
FIGS. 1, 2 and 3 illustrate a first embodiment of the transfer mechanism of this invention using pivoting rollers that pivot out of the way to make room for lift truck platens or forks.
Figure 2:
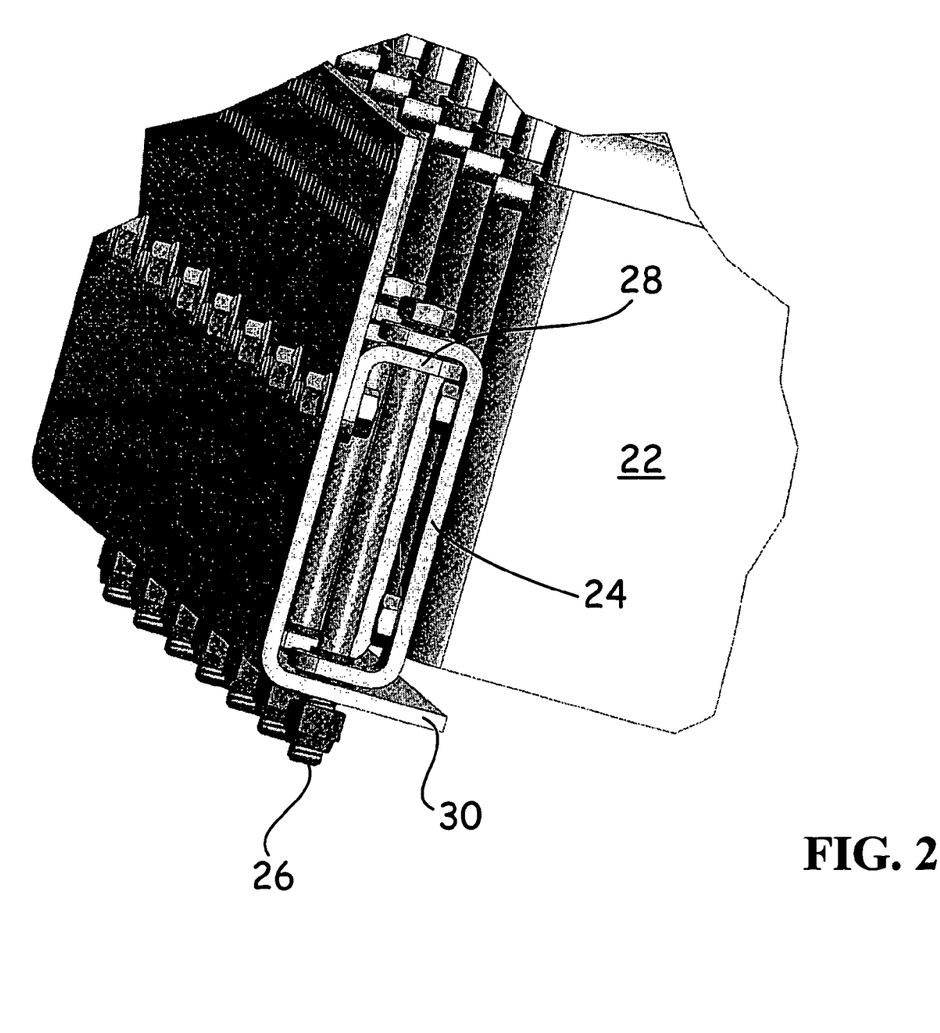
Figure 3:
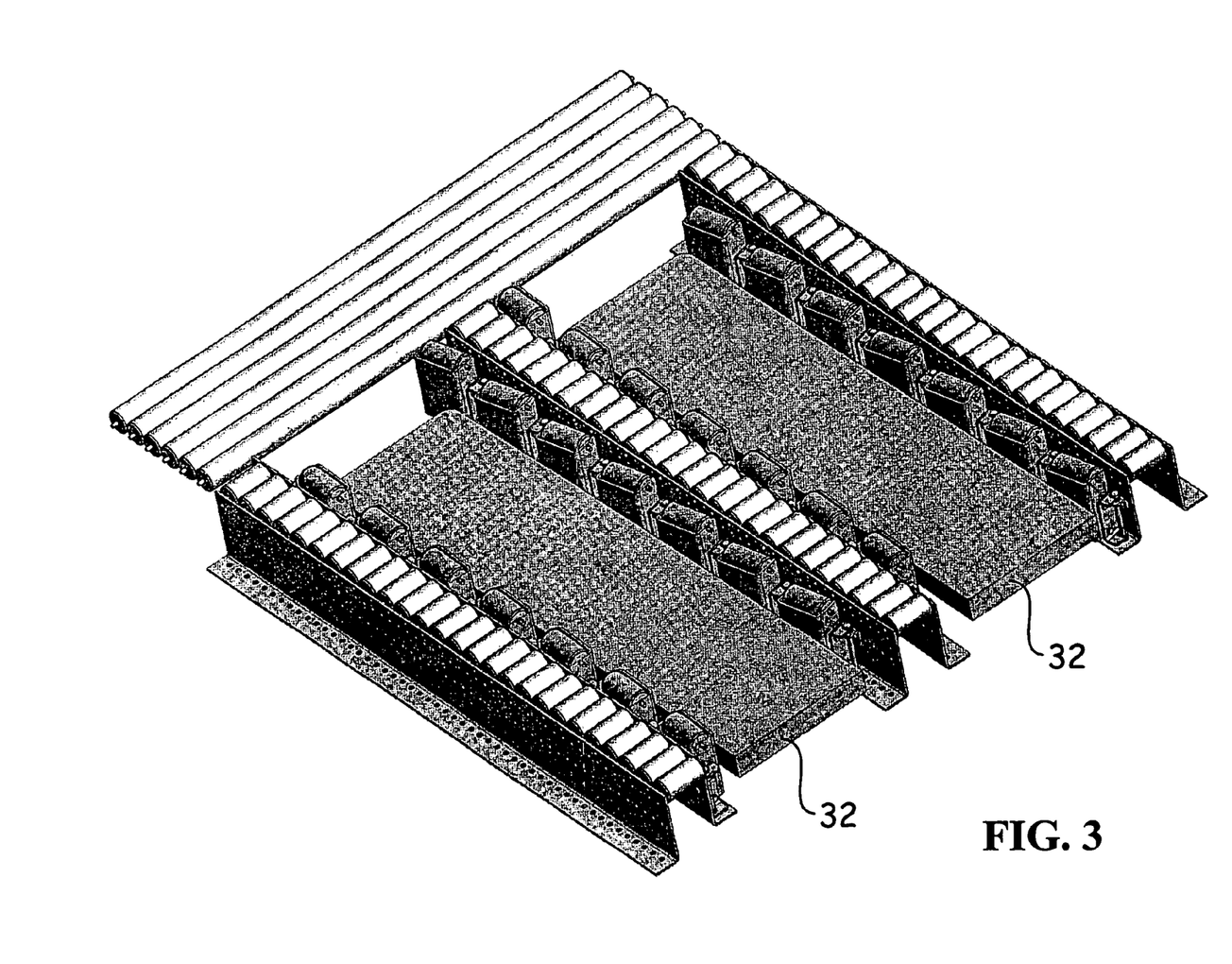

In the first embodiment of the transfer structure of this invention, illustrated in FIGS. 1, 2, and 3, the transfer structure comprises a generally rectangular structure approximating the size of a conventional slip sheet. The transfer structure, as may be seen in FIG. 1, includes: (1) fixed rollers positioned in the same plane as adjacent roller conveyor structure and (2) movable rollers that move, in response to the presence of lift truck platen, from a first position with the rollers in the same plane as to fixed rollers, to a second position that may or may not place the movable rollers in the same plane but that provides room for the lift truck platens.

FIGS. 1, 2, and 3 illustrate a first embodiment of this invention where the transfer structure 10 is mounted adjacent to conventional roller conveyor structure 12. As shown in FIG. 1, fixed rollers 14 and 18 are located at the side edges and middle of transfer structure 10. The tops of roller 14, 16, and 18 are in the same plane as, and their rotational axes are parallel with, rollers 12 of the conventional conveyor structure. Pivotable rollers 20 are located on either side of rollers 16 and on the inner sides of rollers 14 and 18. Each pivotable roller 20 is mounted on a housing 22. As may be seen by reference to the fragmentary details shown in FIG. 2, the housing 22 is attached to a bracket 24 that pivots on a hinge bolt 26 that also passes through a mounting bracket 28 that is fastened to a roller support channel 30.

Operation of the transfer structure embodiment shown in FIGS. 1, 2, and 3 can be appreciated by comparison of FIGS. 1 and 3. A load mounted on a slip sheet resting on platens 32 is moved onto transfer structure 10 by advancement of platens 32 from the position shown in FIG. 1 outside of the transfer structure 10 to the position shown in FIG. 3 where platens 32 are positioned between the central fixed roller 16 and one or the other of rollers 14 and 18. As platens 32 move into that position, their ends contact the housings 22 of pivotable rollers 20 and cause the housings to pivot from the positions shown in FIG. 1 with the rollers 20 parallel to rollers 12 to the positions shown in FIG. 3, in which rollers 20 are generally perpendicular to rollers 12. After platens 32 and the load and sup sheet (not shown) move into the transfer structure as shown in FIG. 3, platens 32 are lowered until the slip sheet rests solely on rollers 14, 16, 18, and 20, and platens 32 are withdrawn, allowing pivotable rollers 20 to pivot (under force from springs or other suitable structures not shown) to the position shown in FIG. 1 in which the rotational axes of all rollers are parallel.

After the slip sheet and load are thus resting solely on the rollers of transfer structure 10, the load can be pushed in the direction of conveyor rollers 12 and can move along the conveyor system in the conventional manner.

As will be appreciated by one skilled in the conveyor art, the transfer structures of this invention can also be used for removal of a load resting on a slip sheet by movement of the load onto the transfer structure and use of the lift tuck platens in steps that are reverse in order from the above description.

Figure 4:
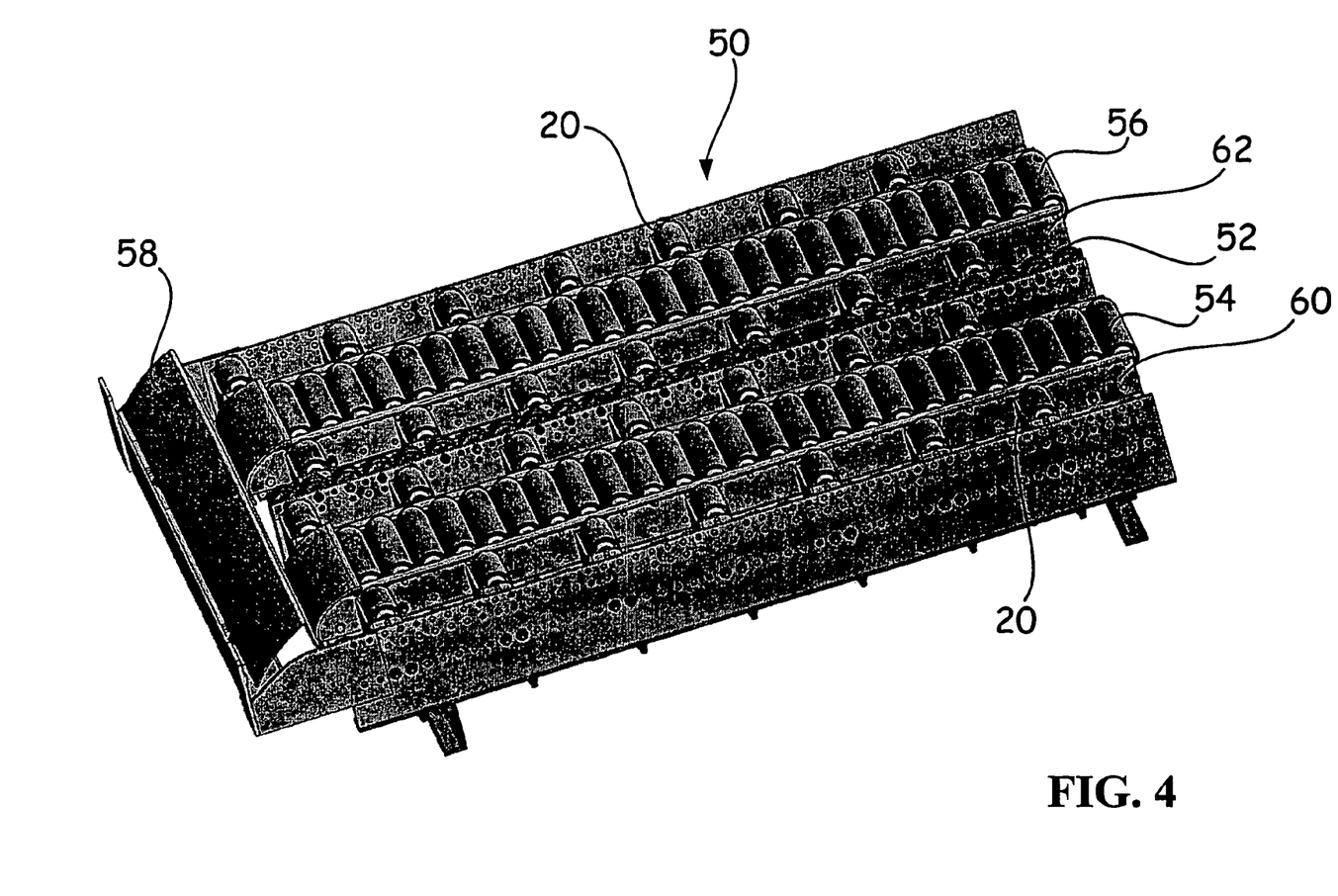
FIGS. 4, 5 and 6 illustrate a second embodiment of the transfer mechanism of this invention using pivoting rollers and racks of rollers that pivot down and back to make room for lift truck platens or forks.
Figure 5:
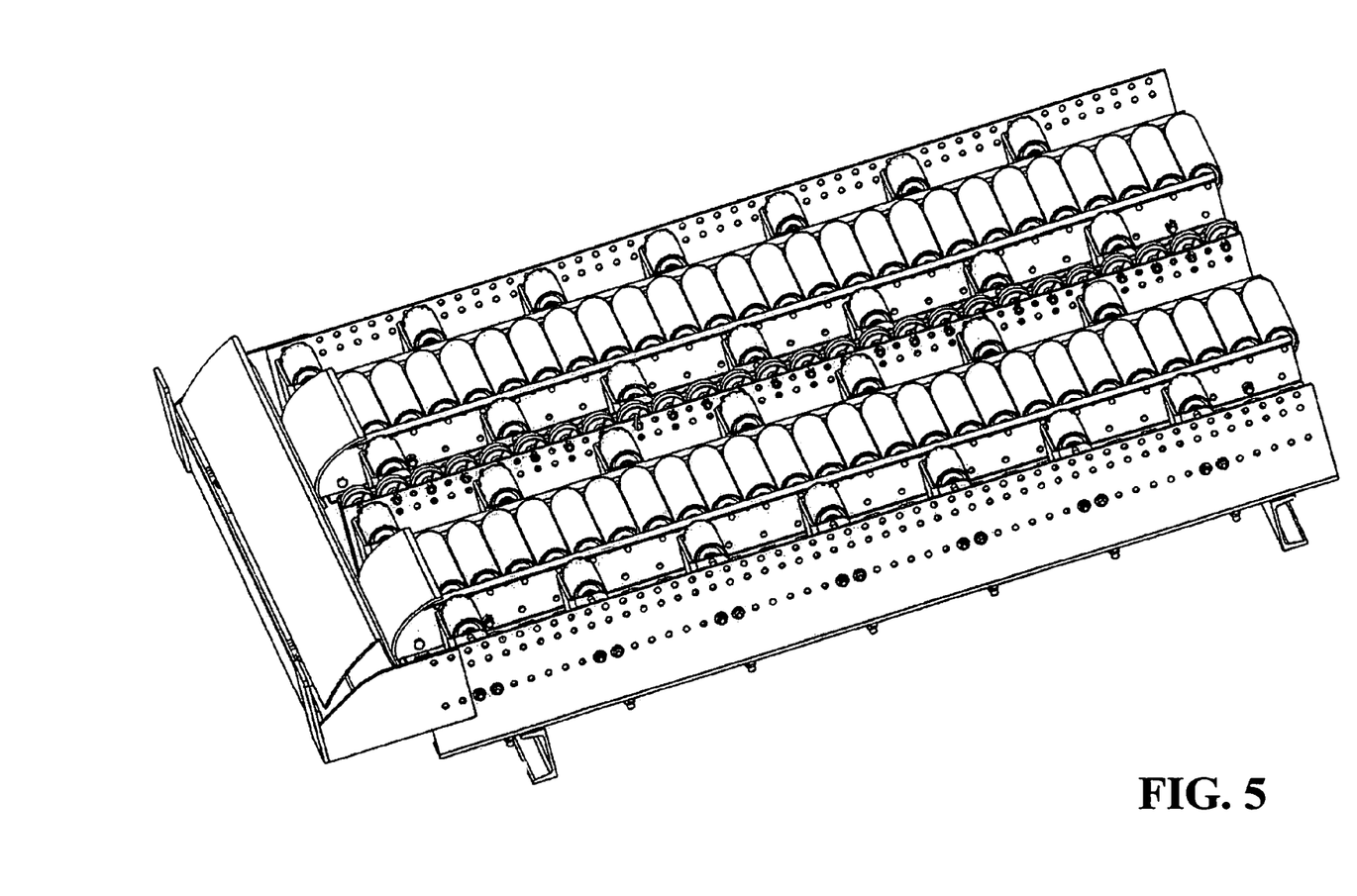
Figure 6:
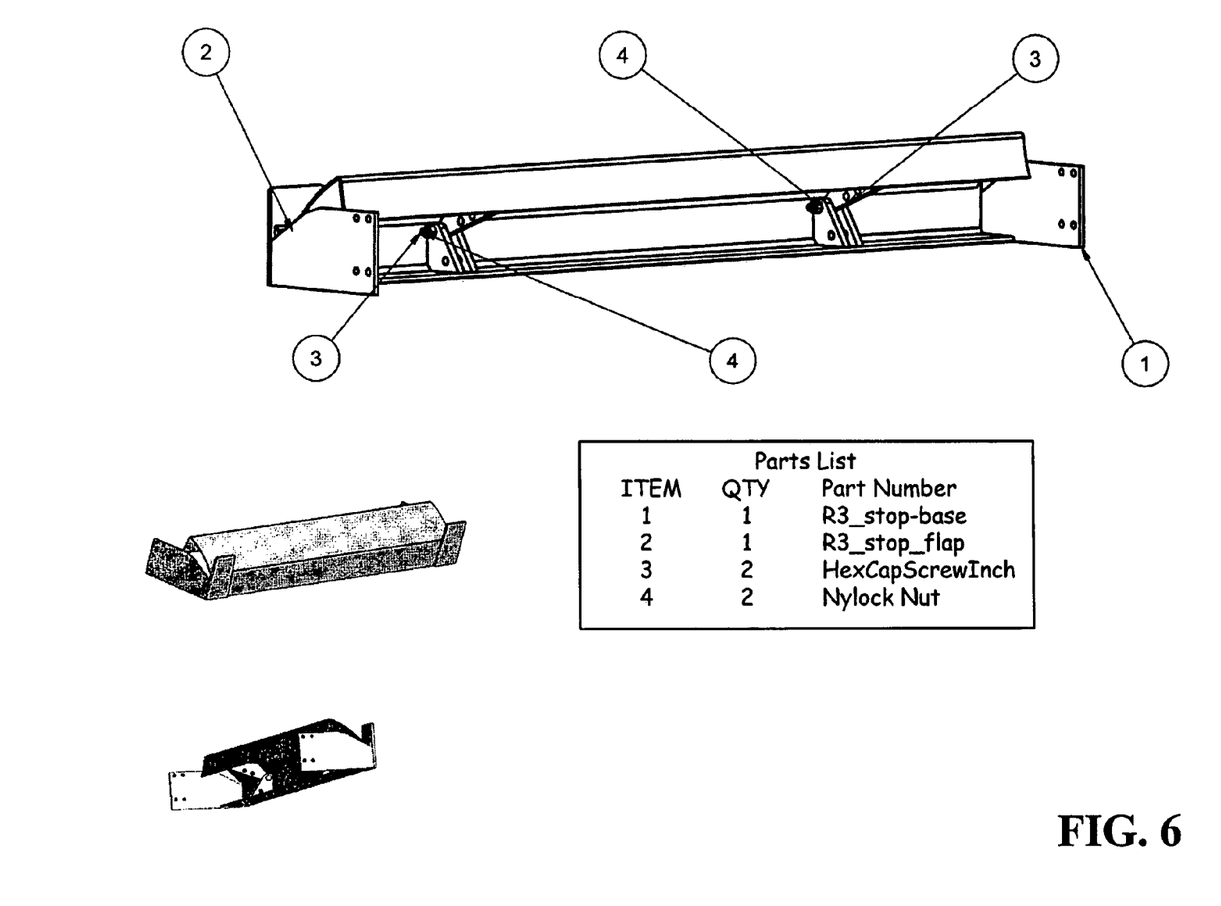

FIGS. 4, 5, and 6 illustrate a second embodiment 50 of the transfer structure of this invention. In embodiment 50, hinged rollers 20 (structured in the same manner as hinged rollers 20 in embodiment 10 described above) are utilized. Fixed wheels 52 are located as illustrated in the center of embodiment 50 and, optionally, other fixed wheels or rollers (not shown) may be used, depending on the nature of the loads to be handled and their dimensions.

Embodiment 50 also utilizes two sections of rollers 54 and 56 mounted in a manner so that they are biased by a spring, pneumatic cylinder, or other suitable structure normally to be in the position shown in FIG. 4. However, sections of rollers 54 and 56 but may be caused to pivot downwards by platens 32 (not shown in FIGS. 4, 5 and 6) so that platens 32 may lie on top of the sections of rollers 54 and 56.

In operation of this embodiment 50, the ends of platens 32 contact stop 58 as the platens move to the right in FIG. 4. Stop 58 is coupled to support structure 60 and 62 for rollers 54 and 56, respectively, causing support structures 60 and 62 to pivot to the right and downward in FIG. 4 to positions out of the way of platens 32, so that a load resting on a slip sheet in turn resting on platens 32 may be placed on or moved from transfer structure 50.

As described above relative to the first embodiment (10) of this invention, the pivotable rollers 20 pivot. When the load is lifted off of transfer structure 50 or platens 32 are moved out from under the load and slip sheet, the pivotable rollers 20 pivot forward to the position shown in FIG. 4, and the sections of rollers 54 and 56 move back and up to the position shown in FIG. 4, providing additional support for the slip sheet that remains on the transfer structure 50 or that is moved from the conveyor rollers 12 onto transfer structure 50.

Figure 7:
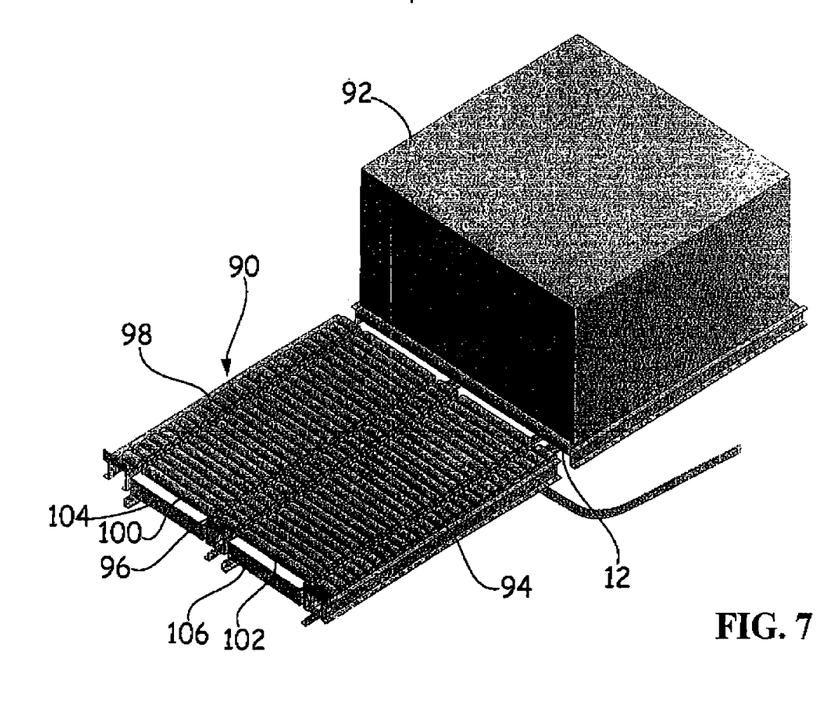
FIGS. 7, 8 and 9 illustrate a third embodiment of the transfer mechanism of this invention using racks of rollers that move down and back on tracks to make room for lift truck platens or forks.
Figure 8:
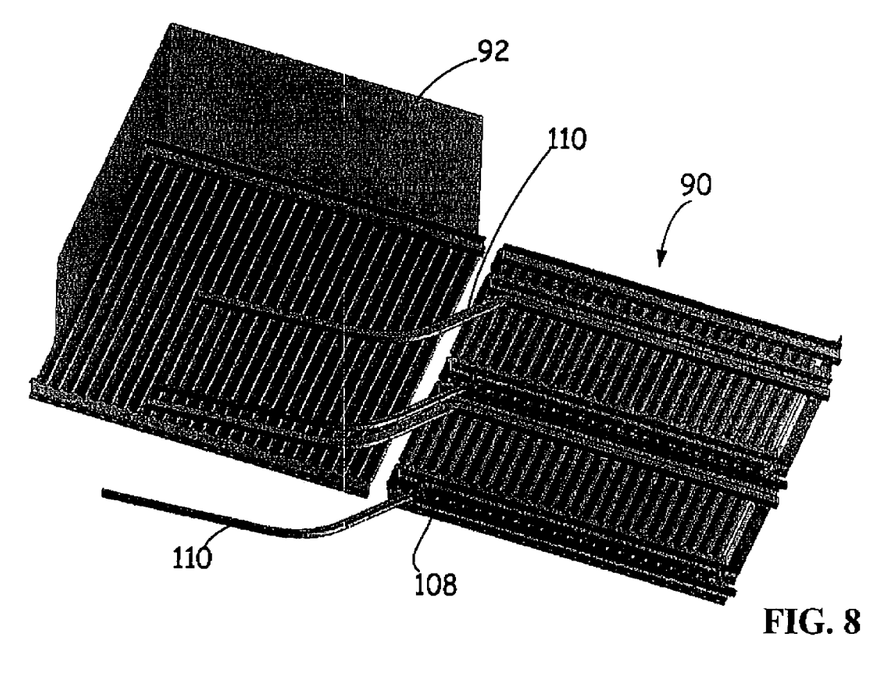
Figure 9:
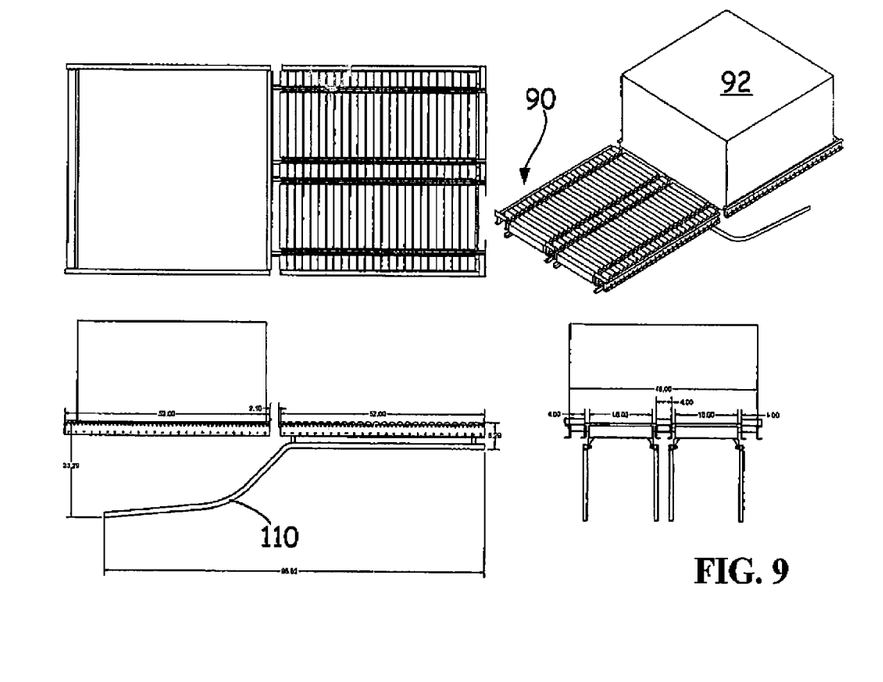

FIGS. 7, 8, and 9 illustrate a third embodiment 90 of the transfer structure of this invention together with a load mounted on a slip sheet schematically illustrated as a load 92. Transfer structure 90 utilizes relatively short fixed rollers 94, 96, and 98, mounted parallel to rollers 12 of a conventional conveyor structure. Sliding rollers 100 and 102 also mounted parallel to conventional rollers 12 are fixed in rack frames 104 and 106. Each of frames 104 and 106 is mounted, as may be best appreciated by reference to FIG. 8, to travel down and under rollers 12 to provide room for platens 32 (not shown) during transfer of a slip sheet mounted load. Roller racks 104 and 106 may, for instance, rest on wheels 108 that travel in tracks 110. Roller racks 104 and 106 are biased by springs, pneumatic cylinders, or other appropriate devices, to return to the positions illustrated in FIGS. 7 and 8 after platens 32 have moved away from the transfer structure 90.

As will be appreciated by reference to the Figures and description of this invention above, it can be practiced in several alternative configurations including configurations not shown in the drawings.

In general, all such configurations can provide a transfer mechanism with multiple rollers for supporting a load mounted on a slip sheet so tat the load can advance on rollers in the transfer mechanism to a conventional roller conveyor structure or can advance from a conventional roller conveyor structure to the rollers of the transfer mechanism. Some of the rollers or wheels of the transfer mechanism remain fixed in a plane that is substantially the same plane as the tops of adjacent rollers of the conventional roller conveyor. Other rollers, wheels, or other support structures are positioned and mounted to move from: (1) a first position where their support surfaces are in the same plane with the support surfaces of the fixed rollers, wheels or other support structures to (2) a second position permitting the platens of a lift truck to be positioned with their support surfaces in the same plane as the support surfaces of the fixed wheels or rollers. Other load bearing surfaces substitutable for rollers and wheels can be used in appropriate circumstances, including, for instance, low friction surfaces and conveyor belts among other alternatives.

The invention claimed is:

1. A conveyor transfer structure for use with loads resting on a slipsheet and for use with a lift truck platen, the transfer structure comprising;
    (a) fixed-position rollers for continuous contact with the slipsheet in a plane, wherein the fixed position rollers comprise longitudinal axes perpendicular to a conveying direction, and
    (b) movable position rollers movable, in response to contact with the lift truck platen, between first positions supporting portions of the slipsheet in the same plane as the fixed position rollers, and second positions below the plane of the fixed position rollers and our of contact with the slipsheet, the second positions permitting lift truck platen contact with the portions of the slipsheet, wherein the movable position rollers comprise longitudinal axes perpendicular to the conveying direction in both the first positions and the second positions.

2. The conveyor transfer structure of claim 1, wherein the movable position rollers move out of contact with the slipsheet in the second positions.

3. A conveyor transfer structure for use with a slipsheet and a platen, the transfer structure comprising:
    (a) fixed-position rollers for continuous contact with the slipsheet in a plane, wherein the fixed position rollers comprise longitudinal axes perpendicular to the conveying direction, and
    (b) movable position rollers movable, in response to contact with the platen, between first positions supporting portions of the slipsheet in the same plane as the fixed position rollers, and second positions below the plane of the fixed rollers and out of contact with the slipsheet, the second positions permitting platen contact with the portions of the slipsheet, wherein the movable position rollers comprise longitudinal axes perpendicular to the conveying direction in the first positions and second positions.

4. The conveyor transfer structure of claim 3, wherein the movable position rollers move out of contact with the slipsheet in the second positions.

5. A conveyor transfer structure for use with loads resting on a slipsheet and for use with a lift truck platen, the transfer structure comprising:
    (a) fixed-position rollers for contact with the slipsheet, wherein the fixed position rollers comprise longitudinal axes perpendicular to a conveying direction;
    (b) movable position rollers movable between first positions supporting portions of the slipsheet and second positions by contact with the lift truck platen, the second positions permitting lift truck platen contact with the portions of the slipsheet, wherein the movable position rollers have their longitudinal axes perpendicular to the conveying direction in both the first positions and the second positions; and
    (c) pivotable position rollers pivotable between first positions supporting portions of the slipsheet and second positions by the lift truck platen, the second positions permitting lift truck platen contact with the portions of the slipsheet, wherein the pivotable position rollers comprise longitudinal axes perpendicular to the conveying direction in the first positions and parallel to the conveying direction in the second positions.

6. The conveyor transfer structure of claim 5, wherein the pivotable position rollers remain in contact with the slipsheet in the second positions.

7. A conveyor transfer structure for use with a slipsheet and a platen, the transfer structure comprising:

(a) fixed-position rollers for contact with the slipsheet, wherein the fixed position rollers comprise longitudinal axes perpendicular to the conveying direction;

(b) movable position rollers movable between first positions supporting portions of the slipsheet and second positions by contact with the platen, the second positions permitting platen contact with the portions of the slipsheet, wherein the movable position rollers have their longitudinal axes perpendicular to the conveying direction in the first positions and second positions;

(c) pivotable position rollers pivotable between first positions supporting portions of the slipsheet and second positions by the platen, the second positions permitting platen contact with the portions of the slipsheet, wherein the pivotable position rollers comprise longitudinal axes perpendicular to the conveying direction in the first positions and parallel to the conveying direction in the second positions.

8. The conveyor transfer structure of claim 7, wherein the pivotable position rollers remain in contact with the slipsheet in the second positions.

* * * * *